United States Patent [19]

Ohashi

[11] 4,408,648
[45] Oct. 11, 1983

[54] TUBELESS RADIAL PLY TIRE FOR HEAVY-DUTY VEHICLES

[75] Inventor: Junichi Ohashi, Mishinomiya, Japan

[73] Assignee: The Toyo Rubber Industry Co., Ltd., Osaka, Japan

[21] Appl. No.: 375,643

[22] Filed: May 6, 1982

[30] Foreign Application Priority Data

May 17, 1981 [JP] Japan ................................. 56-74707

[51] Int. Cl.³ ...................... B60C 15/00; B60C 13/00; B60C 9/00
[52] U.S. Cl. ............................ 152/353 C; 152/353 R; 152/356 R; 152/359; 152/361 R; 152/362 R
[58] Field of Search ........... 152/353 C, 353 R, 352 R, 152/354 R, 356 R, 357 R, 359, 361 R, 361 DM, 361 FP, 362 R, 375

[56] References Cited

U.S. PATENT DOCUMENTS

| | | | |
|---|---|---|---|
| 3,515,196 | 6/1970 | Floria | 152/352 |
| 3,789,898 | 2/1974 | Montagne | 152/361 R X |
| 4,342,353 | 8/1982 | Tamura et al. | 152/362 R |
| 4,345,634 | 8/1982 | Giron | 152/353 R |
| 4,349,061 | 9/1982 | Hirakawa et al. | 152/353 R X |
| 4,366,851 | 1/1983 | Makino et al. | 152/362 R X |

Primary Examiner—William A. Powell
Assistant Examiner—Thomas Bokan
Attorney, Agent, or Firm—Flynn, Thiel, Boutell & Tanis

[57] ABSTRACT

A flat crown type of tubeless radial tire for trucks or buses to be mounted on a frusto-conical rim comprising a carcass of organic fiber cord plies and a belt of metallic cords, wherein a region having a small thickness of the sidewall portion is made sufficiently wide to ensure a flexibility, thicknesses at the bead portion are secured in sufficient dimensions to ensure a stiffness of it, and the intermediate region from the sidewall to bead is shaped and profiled, when the tire is as-molded, in a smooth line of two curves of reverse curvature, one of which on the sidewall side defines a negative curve and the other of which on the bead side a positive curve.

1 Claim, 3 Drawing Figures

TUBELESS RADIAL PLY TIRE FOR HEAVY-DUTY VEHICLES

BACKGROUND OF THE INVENTION

This invention relates to tubeless radial-ply tires for trucks or buses which comprise carcass plies made of an organic fiber and are adapted to be mounted on a frusto-conical bead rim. More particularly, it relates to an improvement relating to flat crown type tires (low profile tires).

A radial ply tire for heavy-duty vehicles such as trucks or buses whose carcass ply cord is made of an organic fiber, e.g. polyamide, polyester or the like has many advantages over the same type of tires comprising a carcass made of steel cords, for example, in respect of reduction of tire weight, economy in fuel cost of the vehicle, fatigue resistance and renewability of the ply cord material (cf. fretting in the case of steel cord), etc. On the other hand, however, the tire has an insufficient stiffness of the carcass plies, particularly in their turned-up portion at the bead portion because of the low flexing stiffness of the cord per se, so that the turned-up portion of the carcass plies and its vicinity are, when the tire is loaded, likely to cause a separation owing to deformation stress.

In order to make up for this insufficiency or deficiency of stiffness, various measures are usually adopted; for example, reinforcement plies of metallic cords are provided at the bead portion, a hard rubber is used, the thickness of the bead portion is increased, etc. These measures, however, produce adverse results concurrently with the results as intended. That is to say, a separation is likely to occur because of a stiffness gap at the end of the reinforcement plies, and the region extending from the bead portion to the sidewall portion is caused an increase of the weight due to the excess volume and a significant energy loss due to heat build-up.

Furthermore, disadvantageous is the case of a tubeless tire to be mounted on a frusto-conical seat rim (for example a taper of 15°), where the breadth of bead base portion is made wider in order to maintain the air-tightness and to secure the portion to the rim. As a consequence, the bead portion has a larger thickness in comparison with a general tube tire (a flat base and a rim of a taper of 5°) while the sidewall portion having a flexibility is of a narrow area, and deformation sometimes occurs in the neighborhood of the bead portion when the tire is imposed with a load. Particularly, with a low-profile tire (e.g., wide base 70-, 75-, 80-series) whose section height is lower as compared with a tire of the same load capacity (H/W=ca. 88%), it is disadvantageous that the sidewall range tends to be narrow.

In general, with a tubeless tire to be mounted on a frusto-conical seat rim, the region from the sidewall portion to the bead portion is shaped and profiled so as to be gradually decreased in thickness from the bead toward the sidewall, at a location of which having its minimum thickness the section width of the tire is its maximum. As a consequence, a region having a small thickness and a flexibility of the sidewall portion tends to be narrow.

When the tire of this kind undergoes a load and bends, its deformation region is near the bead portion, where the end of reinforcement plies and the turned-up end of carcass plies have large deformation stresses. In contrast, in the case of a tire comprising a sidewall portion having a wide range of thin, flexible region, the sidewall portion shares in majority of load deformations and the bead portion is deformed in a small rangae. This is because the foregoing tire comprising the sidewall portion of which thin and flexible region is narrow flexes longitudinally, when subjected to the same load as in the case of the tire having a wide thin-sidewall region, almost equally to the latter tire, so that the region of a large thickness extending from the sidewall portion to the bead portion is forced to be deformed.

Particularly, with a radial ply tire wherein carcass ply cords are disposed at an angle of about 0° relative to the radial direction, it is essential to enhance stiffness and to make the sidewall portion mainly share in the flexure deformations when the tire is loaded, thereby to ensure tire durability. This is performed by either providing a stiff belt ply at the tread portion and a reinforcing ply in the turned-up portion of the carcass plies at the bead portion or increasing a thickness of the bead portion.

In the case of a radial tire adapted to be mounted on a frusto-conical seat rim as specified in this invention, it is still more necessary to render a thickness of the bead portion substantial, thereby to assure a durability since its rim flange height is relatively low and the end of carcass plies wrapped around the bead wires and the end of reinforcement plies are located higher than the rim flange.

In view of the situations described above, various approaches have been taken to make a thin-sidewall region as wide as possible and to ensure a sufficient stiffness for the bead portion.

For instance, an improvement in such tubeless radial tire to be mounted on a frusto-conical seat has been proposed and disclosed in Japanese Published Application (Unexamined) No. 55-19685 (1980). According to it, a tire is shaped to be defined on its outer periphery with at least one recessed portion having a radial length of 30 to 40% of the radial distance between the bead seat and the maximum section width point, when the tire is mounted on a standard rim, inflated and unloaded. Here, the region of the recessed portion usually corresponds to a bead-to-sidewall transitional area which shares in the deformations caused under a load by reason of a continuous change from a stiffness of the bead portion to a suppleness or flexibility of the sidewall portion. Consequently, the deformation strains should be progressively increased from the bead portion to the sidewall portion. However, if there is a local large deformation or bending in that region, it is likely to cause separation or fatigue of the carcass ply cords.

Thus, in the case of this proposed tire, the recessed portion causes the concentration of stresses or discontinuity of strains because of a kind of notch effect, which accelerates the fatigue of that portion and eventually results in the decrease of tire durability.

SUMMARY OF THE INVENTION

In view of the prior art problems as described above, an object of this invention is to provide a radial tire which is improved in the bead contour so as to make a flexible, thin region of the sidewall portion that shares in the deformations upon loading as wide as possible and to meet such a thickness of the bead portion that there is obtained enough bead stiffness to rest the bead portion firmly on a rim, hold air-tightness and ensure durability.

Another object of this invention is to provide a tubeless radial tire comprising carcass plies of organic fiber having various advantages which tire is adapted to be mounted on a frusto-conical seat rim, particularly a flat crown type tire, which is altered in the bead configuration so as to improve the bead durability to a great extent and concurrently to attain a light-weight of the tire without impairing the advantages of the organic fiber carcass ply cords.

BRIEF DESCRIPTION OF THE DRAWINGS

The invention will be hereinafter described in more detail with reference to the accompanying drawings, in which.

DESCRIPTION OF PREFERRED EMBODIMENT

Figure 1:
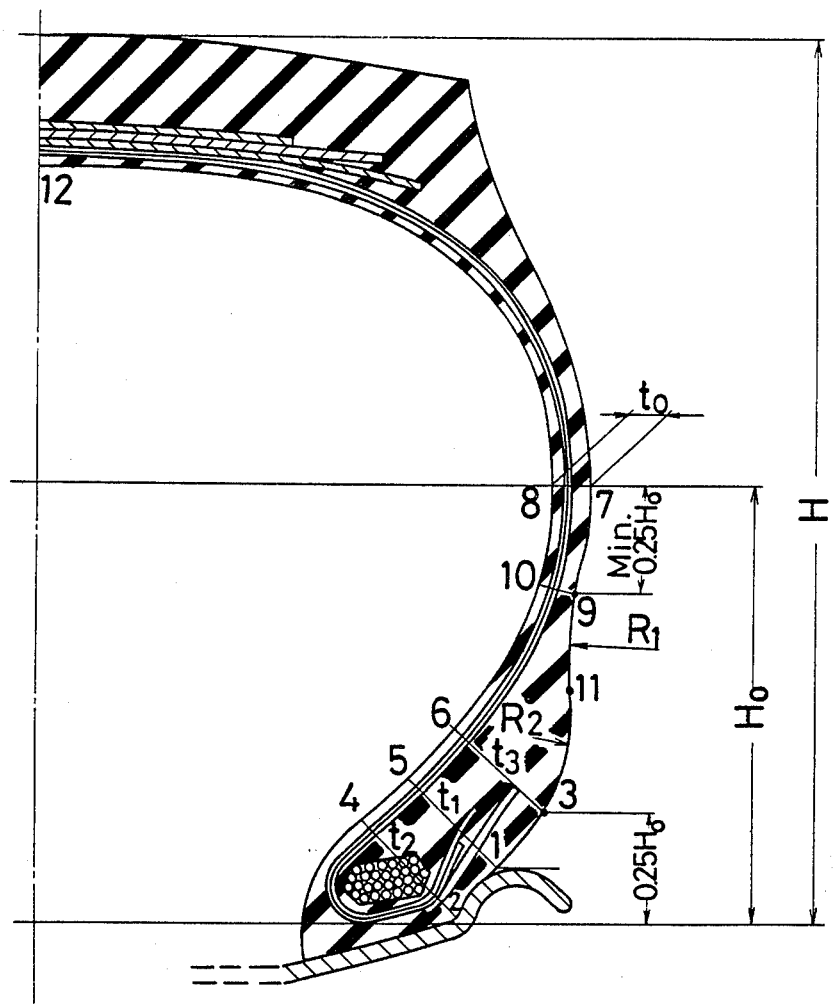
FIG. 1 is a schematic radial sectional view of one example of a radial tire according to this invention, with its symmetrical half omitted.

Now referring to FIG. 1, there is shown a radial tire constructed of fundamental elements of this invention which comprises a carcass of at least two plies of organic fiber cords and a belt of at least two plies or metallic cords and is adapted to be mounted on a frusto-conical seat rim diverging outwardly of the tire at an angle of 15° relative to a parallel line to a tire rolling axis line.

This radial tire has, when mounted on a standard rim and inflated to a design inner pressure, a height $H_o$ at the maximum section width point 7 of it as measured from the rim seat in the range of 40 to 60% of the maximum section height H from the rim seat to the outermost diameter of the tire.

Further, in order that its sidewall portion may share in the flexure deformations produced when the tire is loaded, the dimensions of the bead portion are specified as below. Assuming that a thickness of the sidewall at the maximum section width point 7 of the tire (namely, a thickness of a normal from the maximum section width point 7 to the inner face point 8 of the tire) is $t_o$, it is essential that a thickness $t_1$ of the bead portion at the location of rim flange height, namely a thickness of a normal from the outer face point 1 of the bead portion at the rim flange height to the inner face point 5 of the tire be maintained to be at least 2.5 $t_o$.

In the case of a tire to be mounted on a frusto-conical seat rim as specified in this invention, its rim flange height is generally relatively low as described above, and accordingly, the end of carcass plies turned up around the bead wires and the end of reinforcing plies are located higher than the rim flange, so that the bead portion is required to have a substantial thickness to ensure durability.

With the foregoing in view, it is further essential that a thickness $t_2$ at the rim base diameter point, namely bead heel portion 2 be in the range of 100 to 110% of the thickness $t_1$ from the outer bead point 1 to the inner point 5 of the tire and that a thickness $t_3$ at the 0.25 $H_o$ height point 3 be within the range of 90 to 100% of the foregoing thickness $t_1$, wherein $H_o$ is the same as defined above.

According to a conventional tire, however, where the bead portion is assured to have a substantial thickness, the inner surface and outer surface of the tire are shaped and profiled each in a radius of curvature having each center on the inside of the tire (referred to as a positive curve) so as to have a gradually decreasing thickness in the region extending from the bead portion toward the sidewall portion. Because of this, it is unavoidable in a low-profile tire of a low section height that a region having a small thickness of the sidewall portion is narrow.

In view of this, the present tire is still further constructed so that a thin sidewall region may extend in a sufficiently wide range. To that end, for one thing, the thin sidewall region (7–9) extending from the maximum section width point 7 of the tire to the horizontal height point 9 spaced apart at least 0.25 $H_o$ on the bead side from it is shaped and profiled in a positive curve, and a thickness at the minimum 0.25 $H_o$ point 9 is made to be substantially equal to the thickness $t_o$ at the maximum section width point 7. For the second thing, the transitional region (9-11-3) from the sidewall to the bead portion extending from the minimum 0.25 $H_o$ point 9 to the 0.25 $H_o$ horizontal height point 3 spaced apart 0.25 $H_o$ from the rim base diameter height is shaped in a smooth line of two curves of reverse curvature between which boundary is an inflexion point 11. That is, the side of the maximum section width point 7 from the inflexion point 11 is defined by a curve having a radius of curvature $R_1$ centered on the outside of the tire (referred to as a nagative curve) and the side of the bead portion by a positive curve $R_2$.

Thus, by the construction described above, the intended objects of this invention can be attained, according to which suppleness or flexibility of the sidewall portion and stiffness of the bead portion are concurrently obtained; and since the thin sidewall region having a flexibility is made to take up a wide range and the majority of deformations produced under a load is received in the sidewall portion, the deformations of the bead portion are minimized and therefore, the occurrence of a damage such as a separation at the turned-up end of the carcass plies or a separation at the end of reinforcing plies is lessened to a great extent.

In this connection, it will be understood that the shape or contour of the invention tire thus far described is specified with respect to a tire in the as-molded condition in the shape of a vulcanization mold cavity in which it is molded, i.e., in a free state before mounting on a rim. However, when the tire in this state is mounted on a standard rim and inflated to a design pressure, the shape the inflated tire takes is not always limited to the shape as specified.

When the tire described above is inflated to an inner pressure, it grows in its width direction owing to characteristics of the organic fiber used for the carcass plies and the steel cords used for the belt. As a consequence, the tire contour in the transitional region (9-3) extending from the min. 0.25 $H_o$ horizontal height point 9 being on the bead side from the maximum section width point 7 up to the 0.25 $H_o$ horizontal height point 3 spaced apart 0.25 $H_o$ from the rim base diameter becomes a straight line or a large positive curve.

Figure 2:
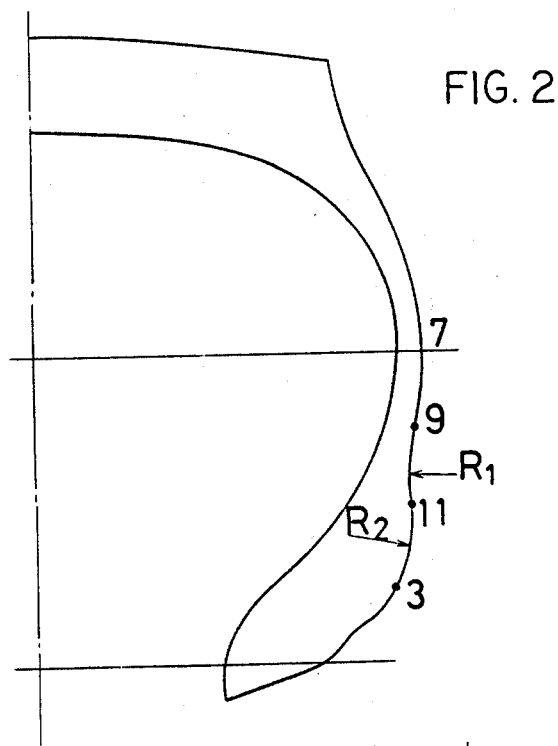
FIG. 2 is an illustration showing a state of the tire of FIG. 1 as it appears in a vulcanization mold or a free state of the as-molded tire.
Figure 3:
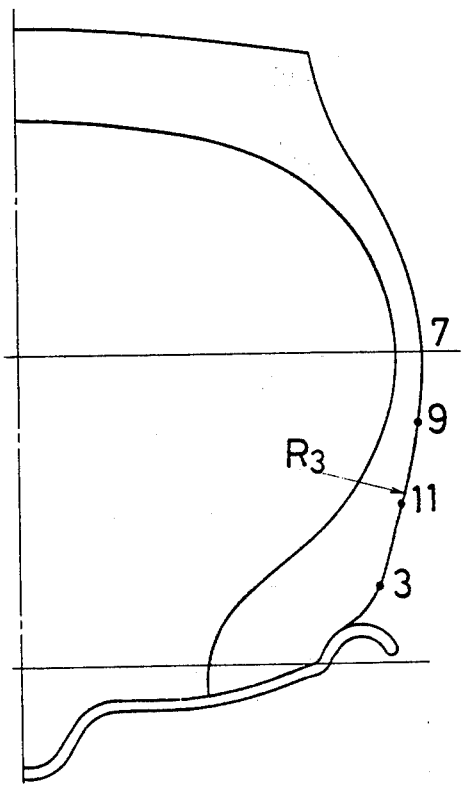
FIG. 3 is an illustration showing a state of the tire of FIG. 1 being mounted on a standard rim and inflated to a design inner pressure.

FIG. 2 and FIG. 3 show the contour shapes of the tire illustrated in FIG. 1 in the changed conditions. As will be seen from FIG. 2, the foregoing transitional region of the tire being in a free state or in the shape of a mold cavity is defined and profiled in a smooth line into which a negative curve $R_1$ and a positive curve $R_2$ blend. In the state of FIG. 3 in which the tire is inflated, the transitional region is changed to be defined smoothly with a straight line or a large positive curve $R_3$.

In this case, if the thin sidewall region (9–11) from the foregoing point 9 to the inflexion point 11 retains the negative curve also when the tire is inflated, then the intermediate region between the bead and sidewall portions will have a depression. A result of this is that concentration of stresses or discontinuity of strains will occur in that region, which leads to promoting the fatigue and lowering tire durability, as is the case with the tire disclosed in Japanese Published Application No. 55-19685 (1980) as mentioned before.

The effect of the depression is especially true in the case of a tire of the same type as the tire of this invention, in which the thickness tapers down from the bead portion to the sidewall portion in a relatively narrow range.

For the above reason, according to a tire of this invention, the shape of carcass plies being in a vulcanization mold is adpated suitably to be consistent with a natural inflation profile (NIP) of carcass plies after inflation, thereby not to form a depression.

Comparative field tests were conducted to corroborate the effect of the depression. For instance, two tires having an outside diameter of 1050 mm, a rim diameter of 24.5 inch and an aspect ratio of 80% were inflated to an air pressure of 74 $Kg/cm^2$, thus one being profiled with a depression and the other no depression and were run at a speed of 40 Km/hr under a load of 600 Kg up to a mileage of 10,000 Km. As a result, the one tire having a depression was decreased in cord strength at the depression position by 20% as compared with it as molded (as manufactured). The other tire having no depression according to this invention was decreased in cord strength at the corresponding position only by less than 3%.

With a radial tire comprising carcass ply cords of organic fiber as intended in this invention, the ply cords are, when the tire is run under a design inner pressure and load, subjected to a strain and thermal hysteresis varying depending on the kind of fiber cords, and grow longer than when the tire is as molded. For example, in the case of a polyester cord which is used for a truck or bus tire, its growth is about 5%. The tire grows a little in the direction of outside diameter which direction is restrained from extension with a hoop effect of the belt and relatively largely in the width direction, and eventually approaches, as a whole, a definite natural inflation profile. It is verified here that the shape or contour of carcass plies from the sidewall portion to the bead portion defines a smooth curve close to a natural inflation profile (as explained in membrane theory) in the thin sidewall region having a small thickness and approaches a straight line in the bead region having a large thickness and high stiffness which extends from the bead portion to bead wires.

In this way, the radial tire comprising organic fiber carcass plies is changed in the contour shape at three stages: the as-molded state in a vulcanization mold, the inflation state of a new tire and the growth state after running. In this case, a substantial change of shape of the bead portion will cause to increase the inner stress and strain, which often leads to a serious defect in the bead durability.

With the foregoing in view, according to a tire of this invention, the carcass ply shape at the bead portion is therefore profiled, in its state in a vulcanization mold, in a straight line which is substantially close to the shape it takes in the growth state, whereby local increase of the inner stress and strain or bending is avoided.

The radial tire according to this invention is constructed as described above and is definitely improved over prior art tires. In order to prove improved effects of the radial ply tire of this invention in which the region having a small thickness of the sidewall portion is made as wide as possible, a sufficient stiffness and thickness in the bead portion is retained, and, when the tire is inflated and run under a load, a local deformation is prevented from occurring, indoor durability tests (drum tests) were conducted in comparison with a conventional tire. The results thus obtained are shown below.

| Conditions | |
|---|---|
| Tire Size: | 11 R 22.5 16PR |
| Air Pressure: | 8.0 $Kg/cm^2$ |
| Load: | 6000 Kg |
| Speed: | 40 Km/Hr |

| Results | Mileage | Failure |
|---|---|---|
| Tire of This Invention | 15,000 Km | None |
| Prior Art Tire | 11,000 Km | Chafer Separation at the bead portion |

The tire of this invention is superior to the prior art tire in bead durability as apparent from the results given above, and besides, is made light-weight. Further, the tire was verified to be capable of decreasing energy loss due to deformations and heat build-up produced in the transitional region from the sidewall to the bead when run under a load.

Since in the tire of this invention, the thin sidewall region is made wider as compared with a prior art tire, the sidewall portion mainly can share in the deformations produced when the tire is run under a load. As a consequence, strain and heat build-up which are of no use can be greatly decreased in comparison with a prior art tire in which the thick-wall portion is forced to be deformed.

Further indoor drum tests on rolling resistance of the foregoing tires have yielded the result that the invention tire provided a decrease in rolling resistance of about 5% over the prior art tire. Advantages of this invention in the durability and economy in respect of fuel cost over prior art were also confirmed.

Thus, the invention can overcome defects of prior art tires and attain improvements in various performances, and is practically useful as tubeless radial tires for trucks or buses.

What is claimed is:

1. A tubeless radial ply tire for heavy-duty vehicles to be mounted on a frusto-conical seat rim comprising a carcass composed of at least two cord plies of orgaic fiber and a belt of at least two plies of metallic cords, wherein when said tire is mounted on a standard rim and inflated to a design inner pressure, a height $H_o$ at the maximum section width point (7) of the tire from the rim seat is in the range of 40 to 60% of the section height H at the outside diameter point of the tire; assuming that the thickness of a normal drawn from the maximum section width point to the tire inside point (8) is $t_o$, dimensions at the bead portion are determined so that a thickness $t_1$ of a normal from the bead outside point (1) at the rim flange height to the tire inside point (5) is 2.5 or more times the thickness $t_o$, a thickness $t_2$ of a normal from the rim base diameter point (2) at the inner end of the flange to the tire inside point (4) is 100 to 110% of the thickness $t_1$, and a thickness $t_3$ of a normal from the 0.25 $H_o$ point (3) spaced apart 0.25 $H_o$ from the rim base diameter point (2) on the maximum section width side to the tire inside point (6) is 90 to 100% of the thickness $t_1$; a thin sidewall region (7-9) having substantially the same thickness as $t_o$ extends from the maximum section width point (7) toward the bead portion in a dimension of at least 0.25 $H_o$ in height up to the min. 0.25 $H_o$ point (9), said region being defined by a radius of curvature centered on the inside of the tire (a positive curve); and a transitional region (9-11-3) extending from the minimum 0.25 $H_o$ point (9) in the sidewall portion to the bead portion has progressively increasing thicknesses, and is shaped so that when the tire is in as-molded state in a vulcanization mold or in a free state after releasing from the mold, its sectional contour defines a smooth line into which two curves or arcs having a radius of curvature $R_1$ centered on the outside of the tire (a negative curve) and a radius of curvature $R_2$ centered on the inside (a positive curve) blend whereas when the tire is mounted on the standard rim and inflated to the inner pressure, its sectional contour defines a positive curve or a straight line.

\* \* \* \* \*